March 25, 1930.　　J. H. DAVIDSON ET AL　　1,751,575
GUM STOCK TRIMMER
Filed April 28, 1927　　2 Sheets-Sheet 1

Inventors:
James Haddon Davidson,
Raymond S. Wade.
by Charles S. Gooding, Atty.

March 25, 1930.   J. H. DAVIDSON ET AL   1,751,575
GUM STOCK TRIMMER
Filed April 28, 1927   2 Sheets-Sheet 2

Inventors:
James Haddon Davidson.
Raymond S. Wade.
By Charles S. Gooding, Atty.

Patented Mar. 25, 1930

1,751,575

UNITED STATES PATENT OFFICE

JAMES HADDON DAVIDSON AND RAYMOND S. WADE, OF WATERTOWN, MASSACHUSETTS, ASSIGNORS, BY MESNE ASSIGNMENTS, TO HOOD RUBBER COMPANY, INC., OF WATERTOWN, MASSACHUSETTS, A CORPORATION OF DELAWARE

GUM-STOCK TRIMMER

Application filed April 28, 1927. Serial No. 187,393.

This invention relates to a gum stock trimmer adapted to be used for trimming the opposite edges of a sheet of fabric impregnated with rubber. The fabric is impregnated with rubber at a calender, and the guides for the rubber compound on the feed side of the calender are set a little wider than the sheet of fabric which is being impregnated. As the fabric passes between the rolls it receives a layer of gum or rubber compound, and this layer projects slightly beyond the opposite edges of the fabric, so that the fabric carries with it on each edge thereof a strip of gum. It is necessary that this strip of gum should be removed either at the calender, during the impregnating operation, or during subsequent work on the fabric.

The device of this invention trims the gum from the fabric sheet along the opposite edges thereof at the calender just after the fabric is impregnated with the gum.

While the apparatus of this invention is particularly adapted for trimming the edges of a sheet of fabric impregnated with rubber, it will be understood that it is applicable to other articles, the edges of which it is desired to trim.

The invention consists in the improved gum stock trimmer hereinafter set forth in the specification and particularly pointed out in the claims.

Referring to the drawings:—

Like numerals refer to like parts throughout the several views of the drawings.

Figure 4:
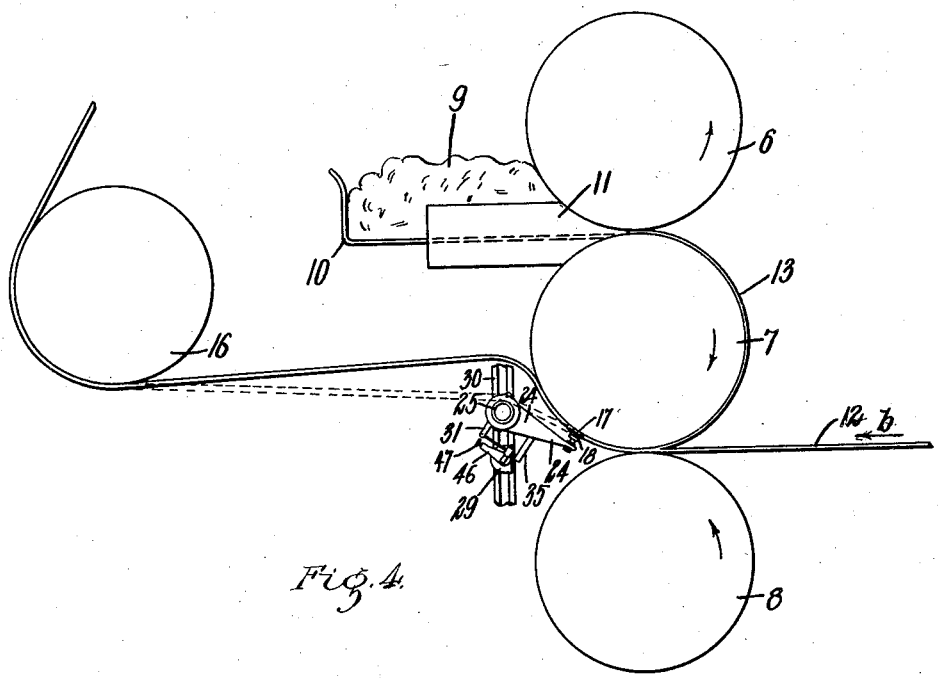
Fig. 4 is a diagrammatic view illustrating the fabric being impregnated with the rubber gum in connection with calender rolls, and the trimming device positioned in relation to one of said rolls, and also a cooling roll to which the fabric passes after having been trimmed.

In the drawings, referring to Fig. 4; 6, 7 and 8 are calender rolls which operate in a manner well known to those skilled in this art. The rubber compound or gum 9 is placed in a tray 10 between two side guides 11. These guides are positioned a little wider apart than the sheet of fabric which is to be impregnated. The fabric 12 is fed between the calender rolls 7 and 8 in the direction of the arrow $b$.

Figure 5:
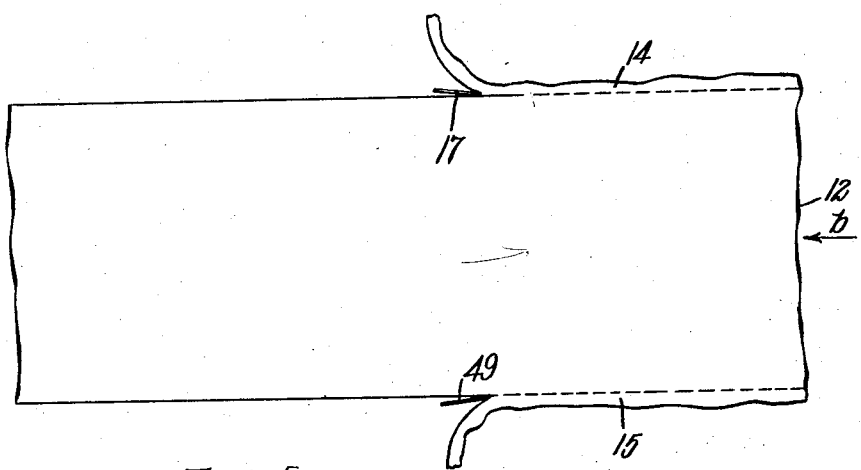
Fig. 5 is a diagrammatic plan view of a portion of a fabric sheet illustrating the relative positions of the cutter blades to each other and to the sheet of fabric as the irregular edges of the gum layer are being trimmed from the fabric sheet.

The calender rolls rotate in the directions of the arrows thereon and the layer of gum 13 passes downwardly around the calender roll 7 and between the calender rolls 7 and 8 upon the upper side of the fabric 12, and a portion of the gum is pressed outwardly beyond the opposite edges of the fabric 12 as shown at 14 and 15, Fig. 5. The impregnated fabric with the layer of rubber thereon then passes upwardly along the periphery of the calender roll 7, as shown in Fig. 4, and thence to cooling rolls, one of which 16 is illustrated in Fig. 4.

Figure 1:
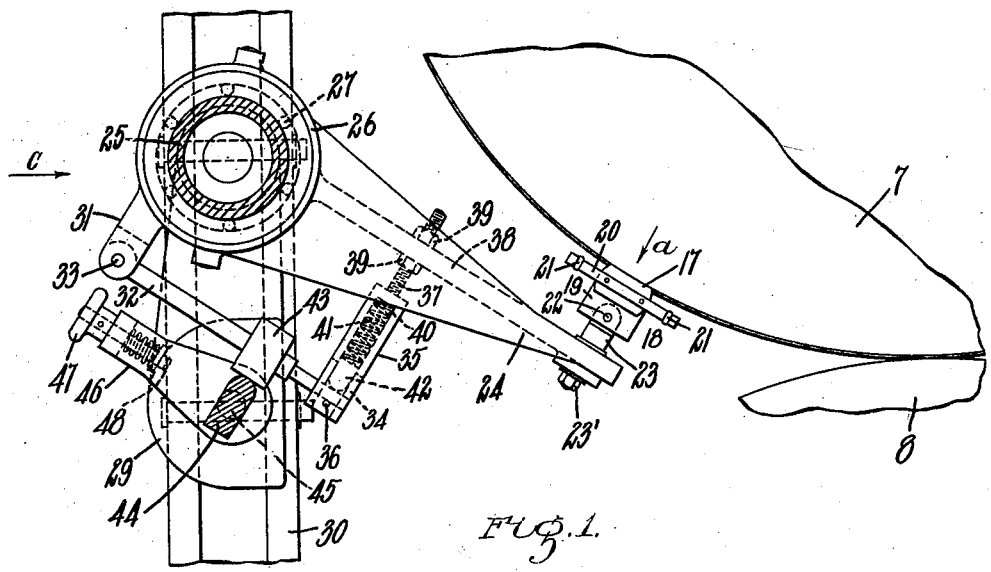
Figure 1 is a side elevation, partly in section, of the device of this invention, the same being illustrated in connection with portions of calender rolls, the frame upon which the device is mounted being broken away.
Figure 2:
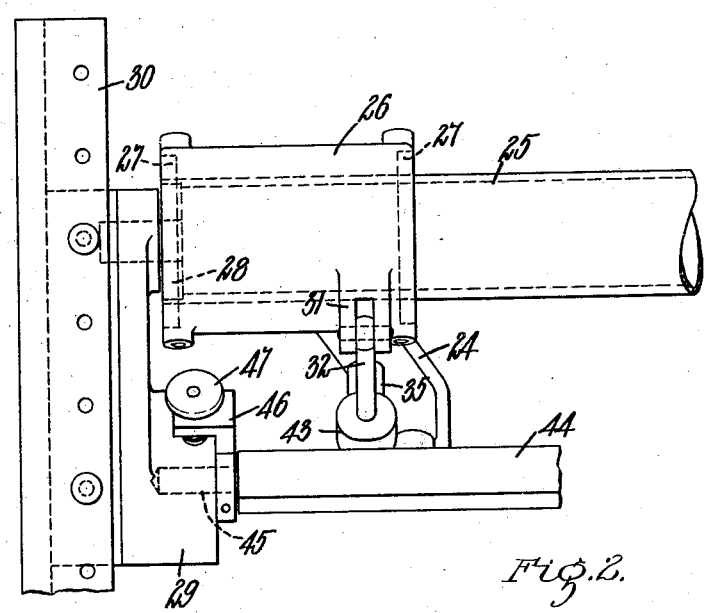
Fig. 2 is a front elevation of a left end portion of the gum stock trimmer viewed from the left of Fig. 1, parts of the device being broken away to save space in the drawing.
Figure 3:
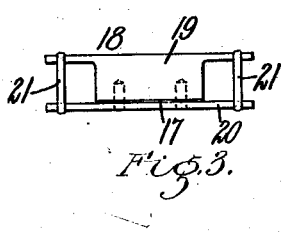
Fig. 3 is a plan view of one of the cutter blades and holder, viewed in the direction of the arrow $a$, Fig. 1.

The edges 14 and 15 of the gum are trimmed from the fabric by the device of this invention, which is particularly illustrated in Figs. 1, 2 and 3, and in a very much reduced scale in Fig. 4.

Referring to Figs. 1, 2 and 3, it will be understood that the trimming device is in substantial duplicate, certain portions being rights and lefts, but operating in the same manner and producing the same result, and therefore, the description referring to the device on one side of the machine will apply equally well to the device on the opposite side. In the drawing the device illustrated is that one which is positioned upon the left hand side of the sheet of fabric, as viewed in the direction of the arrow $c$, Fig. 1, and consists of a cutter blade 17 which is fastened to a holder 18 consisting of a plate 19 and a clamp plate 20, the two plates being held in clamping position by elastic bands 21. The plate 19 is pivoted at 22 to a stud 23, which is fastened to an arm 24, pivotally mounted upon a shaft 25. The arm 24 has a hub 26 thereon and the opposite ends of said hub are provided with ball bearings 27, said arm being thus rotatably mounted upon the shaft 25 and also slidable longitudinally thereof.

The shaft 25 preferably consists of a pipe which is rotatably mounted upon a roller bearing 28 fast to a bracket 29, which in turn is fastened to one of the sides of the frame 30. The hub 26 of the arm 24 is provided with a bifurcated ear 31 and a link 32 is pivotally mounted at 33 between the furcations of the ear 31. The opposite end of the link 32 projects through a slot 34 provided in a connection 35 and normally rests on a cross pin 36 which extends across the connection 35.

The connection 35 has a screw-threaded shank 37 thereon which projects through a rib 38 on the arm 24 and is adjustably connected to the rib on said arm by nuts 39. The connection 35 is provided with a chamber 40 in which is positioned a spring 41, the lower end of which bears against a sliding block 42 having a rounded lower end which bears against the upper edge of the link 32 and normally holds the said link in engagement with the cross pin 36.

A cam roll 43 is rotatably mounted upon the link 32 and bears against a cam plate 44, the opposite ends of which are provided with a shank 45 which has a bearing in the bracket 29, in which it may be rocked, together with the cam plate 44, by an arm 46 which is provided with a spring-actuated pin 47, the inner end of which, when the parts are in the positions illustrated in Figs. 1 and 2, projects into a recess 48, whereby the arm 46 and the cam plate 44 which is fastened thereto may be locked in position.

The cutter blades 17 and 49 are positioned as illustrated in Fig. 5 at an angle to the direction in which the fabric is being fed and at an angle consequently to the fabric, the two cutter blades 17 and 49 being positioned at such an angle that they converge toward each other in a direction opposite to that in which the fabric is being fed. The cutter blades are set at any angle desired by means of the stud 23 and the nut 23' on the end of the arm 24.

The general operation of the device hereinbefore described is as follows:—Assuming the parts to be in the relative positions illustrated in Figs. 1 and 2, the fabric with the layer of gum thereon passes between the calendar rolls 7 and 8 to the cutter blades 17 and 49, the cutter blades being held against the periphery of the calendar 7 by their respective arms 24 and held against the periphery of the calendar roll with a yielding pressure, due to the spring 41 in the connections 35.

Due to the angles at which the cutter blades 17 and 49 are positioned, the gum in passing by the cutter blades exerts a force on the knives which causes the knives to travel toward each other, the arms 24 sliding on the shaft 25 toward each other until the knives engage the fabric 12, whereupon the fabric being harder to cut than the gum, offers enough resistance so that the cutter blades stop in engagement with the opposite edges of the fabric and continue to trim off the projecting gum portions 14 and 15, somewhat as illustrated in Fig. 5 in diagram.

When the trimming operation has been completed, the cutter blades can be thrown out of engagement with the calendar roll 7 by withdrawing the locking pins 47 from the recesses 48 in the brackets 29 on the opposite side frames 30 and the arms 46 can then be tipped downwardly so that the cam plate 44 will assume a position at right angles to that shown in Fig. 1, and the cam roll 43 will then be in contact with the flat side of the cam plate 44, the arms 24 dropping downwardly and thus removing the cutter blades 17 and 49 from contact with the periphery of the calendar roll 7.

The shaft 25, upon which the arms 24 are normally rotatably and slidably mounted, may be rotated if the impregnated fabric sheet should drop downwardly or should be drawn downwardly from the position illustrated in Fig. 4 until the fabric contacted with the shaft 25. The fabric 12 being sticky will adhere to the roll 7 ordinarily until it arrives at the position illustrated in Fig. 4, before it leaves the said roll and passes to the cooling roll 16. At other times the fabric will not adhere to the roll 7 for so long a time but will leave it and move downwardly until it contacts with the shaft 25 as shown in dotted lines, Fig. 4, which will cause said shaft 25 to be rotated by the sticky fabric as it is feed forward to the roll 6. This rotation of the shaft 25 enables the cutter arms to be slid thereon with a very slight effort, it being well known that to move a shaft longitudinally within a collar with which it has a fairly tight fit is very much easier when the shaft is rotated than it would be to push it straight through the collar. However, in any event, the shaft 25 will move longitudinally thereof with very slight effort. The cutter arms are easily slid along the shaft 25 whether it is stationary or rotating on account of the fact that they are provided with anti-friction bearings 27.

We claim:

1. A gum stock trimmer having, in combination, a calender roll, a flat cutter blade, its longitudinal cutting edge extending circumferentially of and contacting with the periphery of said calender roll, a holder for said cutter blade, means to adjust said cutter blade about an axis extending radially with relation to said calender roll and transversely of said cutter blade, means to press said cutter blade against the periphery of said calender roll with a yielding pressure, and means to move the cutter blade into and out of contact with the calender roll.

2. A gum stock trimmer having, in combination, a calender roll, a pivotally mounted arm, a stud on said arm positioned radially with relation to said calender roll, a cutter blade, its longitudinal cutting edge extending circumferentially of and contacting with the periphery of said calender roll, a holder for said cutter blade, a pivot for said holder extending longitudinally of said calender roll and transversely of the cutting edge of said cutter blade, said pivot being positioned on said stud and extending transversely thereof, and means to move said arm with the cutter blade thereon toward and away from the calender roll.

3. A gum stock trimmer having, in combination, a calender roll, a pivotally mounted arm, a cutter blade and a holder therefor mounted on said arm, a link pivoted at one end to said arm, a connection fast to said arm and to which the other end of said link is loosely connected, a cam roll on said link, and a manually operable cam engaging said cam roll and adapted to move said arm and cutter blade toward and away from the calender roll.

4. A gum stock trimmer having, in combination, a calender roll, a pivotally mounted arm, a cutter blade and a holder therefor mounted on said arm, a link pivoted at one end to said arm, a connection fast to said arm and to which the other end of said link is loosely connected, a spring interposed between said link and connection, a cam roll on said link, and a manually operable cam engaging said cam roll and adapted to move said arm and cutter blade toward and away from the calender roll.

5. A gum stock trimmer having, in combination, a calender roll, a pivotally mounted arm, a cutter blade and a holder therefor pivotally mounted on said arm, and means to move said arm, with the cutter blade thereon, toward and away from the calender roll.

6. A gum stock trimmer having, in combination, a calender roll, a pivotally mounted arm, a stud on said arm, its axis extending radially with relation to said calender roll, a flat cutter blade, its longitudinal cutting edge extending circumferentially of and contacting with the periphery of said calender roll, a holder for said cutter blade pivotally mounted on said stud, the cutter blade being positioned at an angle to the direction of feed of the material to be cut, and means to move said arm with the cutter blade thereon toward and away from the calender roll.

7. A gum stock trimmer having, in combination, a calender roll, a pivotally mounted arm, a stud positioned on said arm with its axis extending radially with relation to said calender roll, means to adjust said stud about its axis on said arm, a flat cutter blade, its longitudinal cutting edge extending circumferentially of and contacting with the periphery of said calender roll, and a holder for said cutter blade pivotally mounted upon said stud, the pivot of said holder extending transversely of the cutting edge of said cutter blade and longitudinally of said calender roll, whereby said cutter blade may be adjusted at an angle to the direction of feed of the material to be cut.

8. A gum stock trimmer having, in combination, a calender roll, a pivotally mounted arm, movable longitudinally and transversely of said calender roll, a cutter blade mounted on said arm, means to move said arm, with the cutter blade thereon, toward and away from the roll, and means to adjust said cutter blade at an angle to the direction of feed of the material to be cut, said arm being automatically movable longitudinally of said calender roll by the material engaging said cutter blade when positioned at said angle.

9. A gum stock trimmer having, in combination, a pair of calender rolls adapted to feed sheet material therebetween, a shaft adjacent one of said rolls, parallel thereto, and adapted to support said sheet material passing thereover from said calender rolls, an arm pivotally and slidably mounted on said shaft, a cutter blade mounted on said arm and positioned at an angle to the direction of feed of said material and positioned to engage and sever said sheet material, and yielding means to move said arm and cutter blade toward one of said calender rolls, whereby said cutter blade and its holder may be automatically moved along said shaft.

10. A gum stock trimmer having, in combination, a calender roll, a pair of flat cutter blades and holders therefor, said cutter blades arranged to converge toward each other on opposite edges of a sheet of material on said calender roll the longitudinal cutting edges of said cutter blades extending circumferentially of and contacting with the periphery of said calender roll, and means to press said cutter blades against the periphery of said calender roll.

11. A gum stock trimmer having, in combination, a pair of calender rolls adapted to feed sheet material therebetween, a shaft adjacent one of said rolls and parallel thereto and adapted to support sheet material passing thereover from said calender rolls, a pair of arms pivotally and slidably mounted on said shaft, and a cutter blade mounted on each of said arms respectively, arranged to converge toward each other and positioned to engage and sever said sheet material, and yielding means to move said arms and cutter blades toward one of said calender rolls, whereby said cutter blades and their holders may be automatically moved along said shaft independently of each other.

In testimony whereof we have hereunto set our hands.

JAMES HADDON DAVIDSON.
RAYMOND S. WADE.